United States Patent
Kilroy, IV et al.

(10) Patent No.: US 11,077,900 B2
(45) Date of Patent: Aug. 3, 2021

(54) LOW-SPEED MOTORCYCLE STABILIZER FOR RIDERS WITH LIMITED LEG MOBILITY

(71) Applicants: Edward Kilroy, IV, Deming, NM (US); Travis Snow, Lakewood, CO (US)

(72) Inventors: Edward Kilroy, IV, Deming, NM (US); Travis Snow, Lakewood, CO (US)

( * ) Notice: Subject to any disclaimer, the term of this patent is extended or adjusted under 35 U.S.C. 154(b) by 258 days.

(21) Appl. No.: 16/225,806

(22) Filed: Dec. 19, 2018

(65) Prior Publication Data
US 2019/0185088 A1 Jun. 20, 2019

Related U.S. Application Data

(60) Provisional application No. 62/608,171, filed on Dec. 20, 2017.

(51) Int. Cl.
*B62H 1/12* (2006.01)
*B62J 27/00* (2020.01)
*B62J 45/40* (2020.01)

(52) U.S. Cl.
CPC .......... *B62H 1/12* (2013.01); *B62J 27/00* (2013.01); *B62J 45/40* (2020.02)

(58) Field of Classification Search
CPC .... B62H 1/10; B62H 1/12; B62J 27/00; B62J 45/40
USPC ................. 280/301, 755, 293, 298
See application file for complete search history.

(56) References Cited

U.S. PATENT DOCUMENTS

| | | | |
|---|---|---|---|
| 4,638,880 A | 1/1987 | Togashi | |
| 4,826,194 A | 5/1989 | Sakita | |
| 5,029,894 A * | 7/1991 | Willman | B62H 1/12 280/755 |
| 5,401,055 A * | 3/1995 | Pham | B62D 61/02 180/209 |
| 5,518,259 A | 5/1996 | Hall | |
| 5,904,218 A * | 5/1999 | Watkins | B62D 61/02 180/209 |
| 6,022,037 A * | 2/2000 | Code | B62H 1/10 280/303 |

(Continued)

FOREIGN PATENT DOCUMENTS

| | | | |
|---|---|---|---|
| CN | 106882289 A * | 6/2017 | |
| FR | 2771368 A1 * | 5/1999 | B62H 1/12 |

(Continued)

*Primary Examiner* — Ruth Ilan
*Assistant Examiner* — Hosam Shabara
(74) *Attorney, Agent, or Firm* — Hamilton Patent Services LLC

(57) ABSTRACT

Described herein is a stabilizer system to a rider having limited leg mobility to operate a motorized vehicle having one or more wheels. Multiple embodiments are described, with differing embodiments configured for different mounting positions on different types, makes, and models of motorcycle. One embodiment can mount to a rear frame mount of a sport style motorcycle, while another embodiment can be configured to mount to a lower frame mount of various styles and types of motorcycles. Each embodiment can be controlled via a handlebar mounted switch device, which can be used to raise or lower a stabilization system via an electrically and/or hydraulically powered actuator.

18 Claims, 13 Drawing Sheets

(56) References Cited

U.S. PATENT DOCUMENTS

| | | | |
|---|---|---|---|
| 6,213,237 B1 * | 4/2001 | Willman | B62H 1/12 180/209 |
| 6,237,930 B1 * | 5/2001 | Code | B62H 1/10 280/303 |
| 6,845,999 B2 | 1/2005 | Royal, Sr. et al. | |
| 8,235,419 B1 | 8/2012 | Giarrusso | |
| 8,246,078 B2 | 8/2012 | Yun | |
| 8,851,499 B1 * | 10/2014 | Thompson | B62H 1/12 280/298 |
| 2004/0256835 A1 * | 12/2004 | Royal, Sr. | B62H 1/12 280/293 |
| 2005/0212254 A1 * | 9/2005 | Heitner | B62H 1/10 280/298 |
| 2005/0248140 A1 | 11/2005 | Wagner | |
| 2012/0056403 A1 * | 3/2012 | Lian | B62H 1/12 280/304 |
| 2012/0133116 A1 * | 5/2012 | Yun | B62J 27/00 280/755 |

FOREIGN PATENT DOCUMENTS

| | | | | |
|---|---|---|---|---|
| FR | 2853298 A1 * | 10/2004 | | B62H 1/12 |
| GB | 2104464 A * | 3/1983 | | B62H 1/12 |
| JP | 02003585 A * | 1/1990 | | |
| JP | 02053683 A * | 2/1990 | | |
| WO | WO-2007087255 A2 * | 8/2007 | | B62H 1/12 |

* cited by examiner

LOW-SPEED MOTORCYCLE STABILIZER FOR RIDERS WITH LIMITED LEG MOBILITY

CROSS-REFERENCE

This application claims priority to U.S. Provisional Application No. 62/608,171, titled, "Low-Speed Motorcycle Stabilizer for Riders with Limited Leg Mobility," filed Dec. 20, 2017, which is hereby incorporated herein by reference.

FIELD

This application is directed towards a motorcycle stabilization system that can be engaged at low speed to stabilize the motorcycle.

SUMMARY

Described herein are multiple embodiments of a stabilizer system to enable a rider having limited leg mobility to operate two-wheeled motorized vehicle (e.g., motorcycle). Riders having limited leg mobility may not have sufficient leg mobility or leg strength to balance the motorcycle at low speeds or to support the motorcycle when stopped. The stabilizer system described herein can be employed to stabilize the motorcycle on behalf of the rider. The multiple embodiments described herein can be configured for multiple different mounting positions on multiple different types, makes, and models of motorcycle. One embodiment can mount to a rear frame mount of a sport style motorcycle, while another embodiment can be configured to mount to a lower frame mount of various styles and types of motorcycles. Each embodiment can be controlled via a handlebar mounted switch device, which can be used to raise or lower a stabilization system via an electrically powered actuator and/or hydraulic system.

BRIEF DESCRIPTION OF THE FIGURES

So that the manner in which the above recited features of the present embodiments can be understood in detail, a more particular description of the embodiments, briefly summarized above, may be had by reference to embodiments, some of which are illustrated in the appended drawings. The appended drawings illustrate only typical embodiments, are not to be considered limiting as to all embodiments, and in which.

DETAILED DESCRIPTION

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Rear Mount Support Assembly

Figure 1:
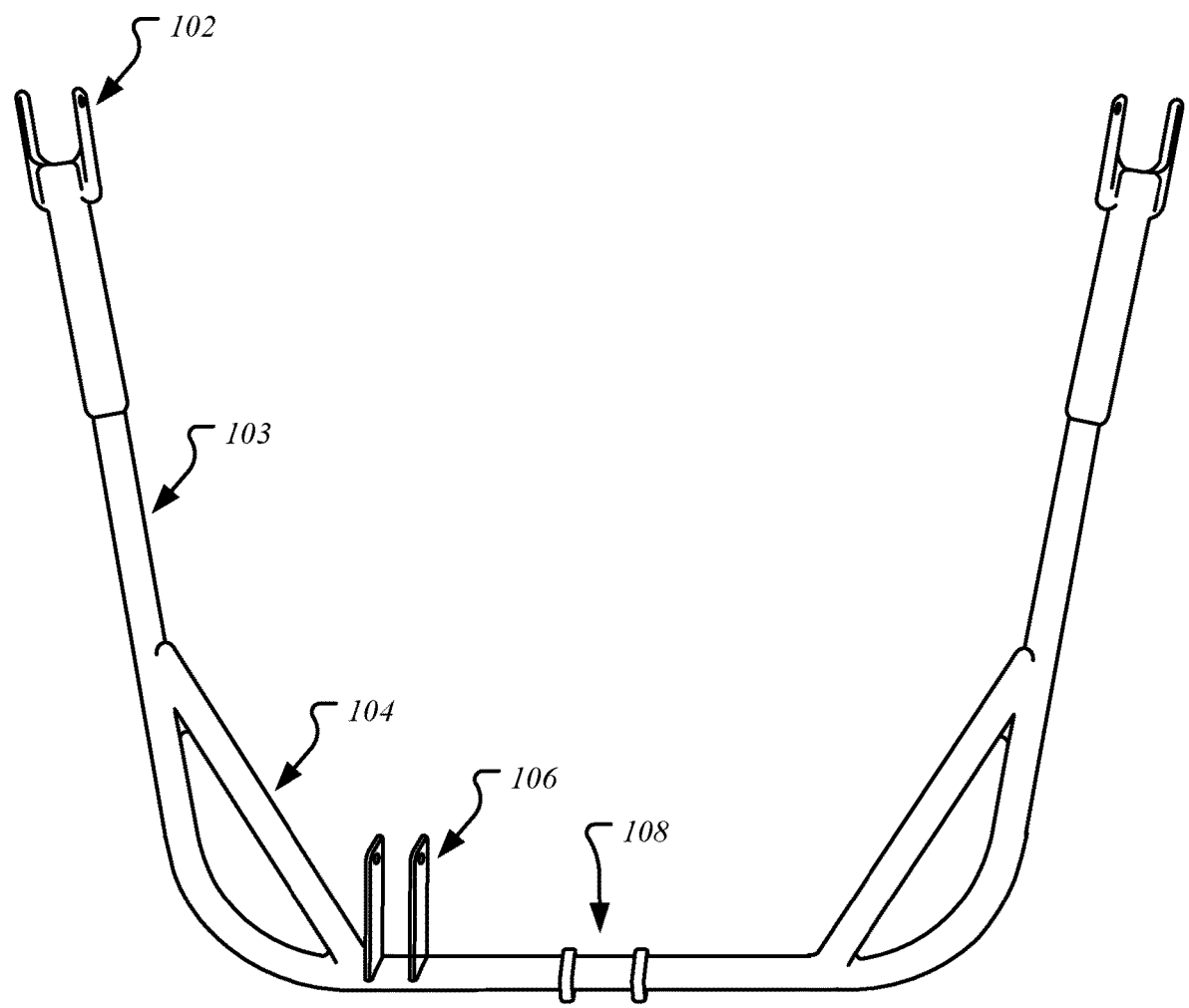
FIG. 1 illustrates a motorcycle support bar, according to an embodiment.

FIG. 1 illustrates a motorcycle support bar, according to an embodiment. In one embodiment, the motorcycle support bar is a metal bar manufactured from a chromium molybdenum steel (e.g., alloy steel grade 4130), or another steel alloy of substantially similar strength. Each end of the support bar includes a wheel mount 102 and a primary support beam 103. In some embodiments, the support bar also includes a secondary support beam 104. The bar also includes at least one actuator mount 106 and a frame mount 108.

Figure 2:
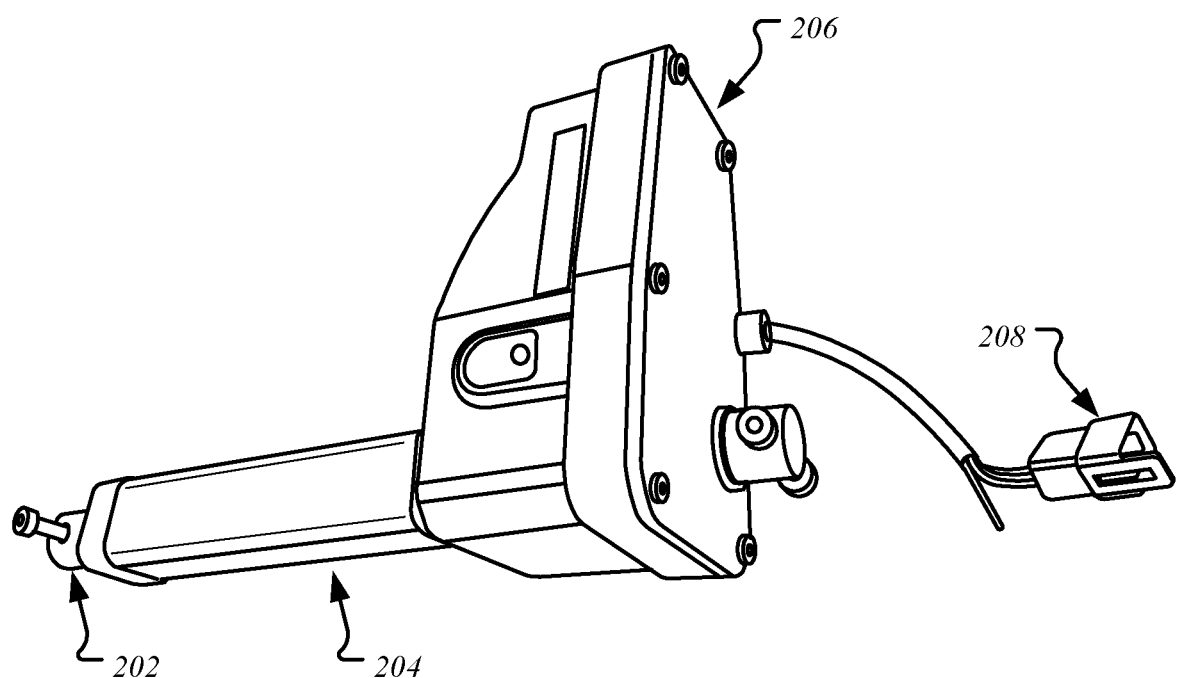
FIG. 2 illustrates an electric actuator to raise and lower a motorcycle support bar, according to an embodiment.

FIG. 2 illustrates an electric actuator to raise and lower a motorcycle support bar, according to an embodiment. The electric actuator includes an electric motor 206 to extend and retract a linear actuator arm 202, which is housed within a protective sheath. The electric motor of the actuator includes an electric connector 208 which can supply power and/or control signals to the actuator motor. The actuator motor can be used to control the extension and retraction of the actuator arm. In one embodiment, the actuator can be powered from the electrical system of the motorcycle.

While an electric actuator is shown, in one embodiment a hydraulic actuator can be used. The hydraulic actuator can be a hydraulic linear actuator, although other designs may incorporate rotary actuators of electric or hydraulic design. In one embodiment, an electro-hydraulic actuator can be used.

Figure 3A:
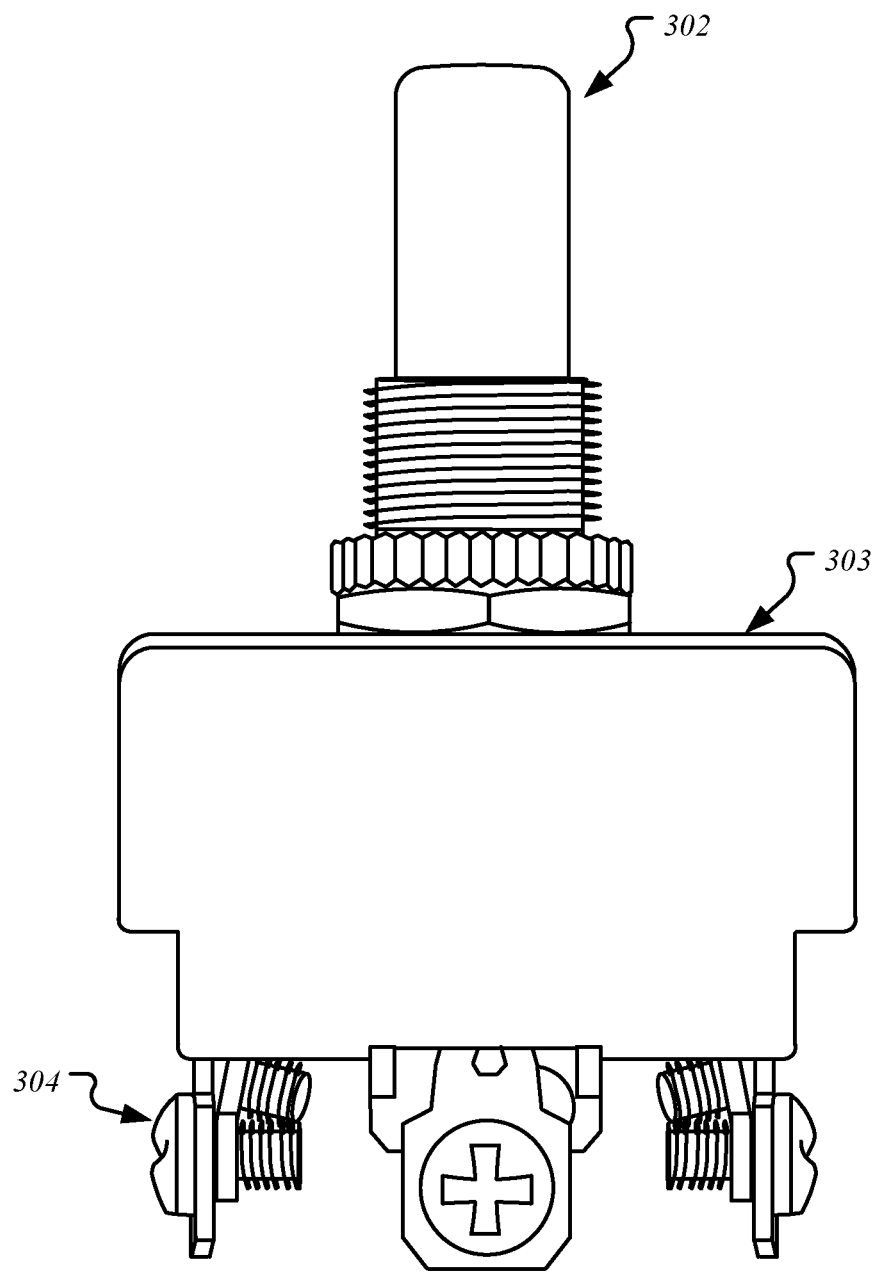
FIG. 3 illustrates a switch to raise and lower a motorcycle support assembly, according to an embodiment.
Figure 3B:
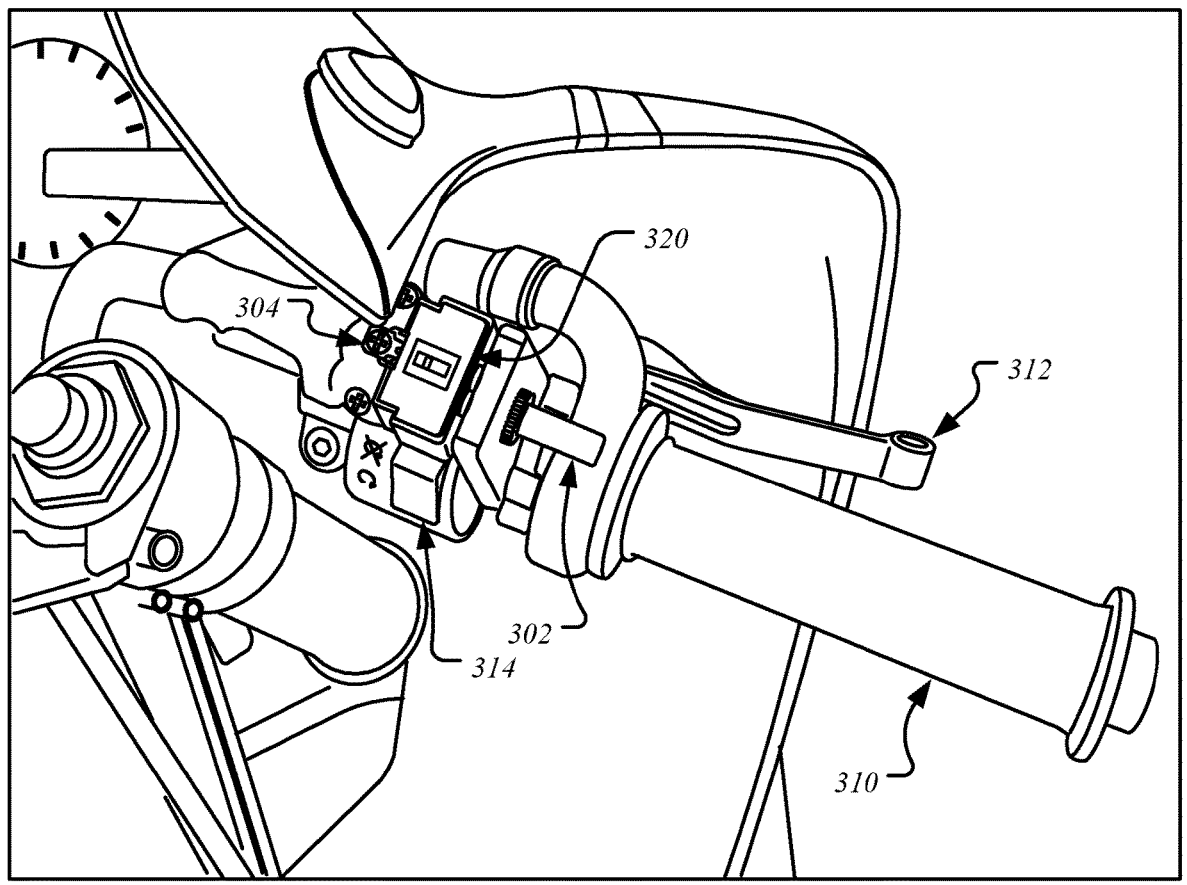

FIG. 3A-3B illustrate a switching mechanism to enable manual control of the stabilizer system. FIG. 3A illustrates a switch to raise and lower a motorcycle support assembly, according to an embodiment. FIG. 3B illustrates a handlebar mount for the switching mechanism, according to an embodiment.

As shown in FIG. 3A, a switching mechanism can have a switch body 303, a switch handle 302 and electrical connections 304. In various embodiments, various types of switching systems known in the art can be used. The switching mechanism can have multiple positions to selectively raise and lower the support assembly or can be a toggle switch that toggles the raising and lowering of the support assembly.

As shown in FIG. 3B, the switching mechanism can be mounted to a handlebar of a motorcycle to enable the rider to raise and lower the support assembly via a thumb actuated switch handle 302. The switching mechanism can be mounted adjacent to the throttle 310, front brake hand lever 312, and power switch 314 of the motorcycle. Electrical connections 304 on the switch can relay control signals to the electric actuator motor to cause the support assembly to raise or lower.

In one embodiment, the illustrated switch can be supplemented or replaced with a microcontroller and accelerometer circuit which can be programmed to raise or lower the motorcycle support assembly as the motorcycle accelerates or decelerates. For example, in one embodiment a small, low power 3-axis accelerator, such as, but not limited to the ADXL337 or ADXL377 can be connected to a microcontroller, such as, but not limited to an Arduino microcontroller, which can be programmed to send control signals to the actuator motor to automatically actuate the support assembly. Other embodiments can use more advanced control circuits, such as an application specific integrated circuit (ASIC) having integrated accelerometer and control circuitry. In one embodiment, automatic or autonomous control can be enabled or disabled via an additional switching mechanism 320. The system can also be configured such that when automatic or autonomous control is enabled, the rider can override the controller via the switch handle 302.

Figure 4:
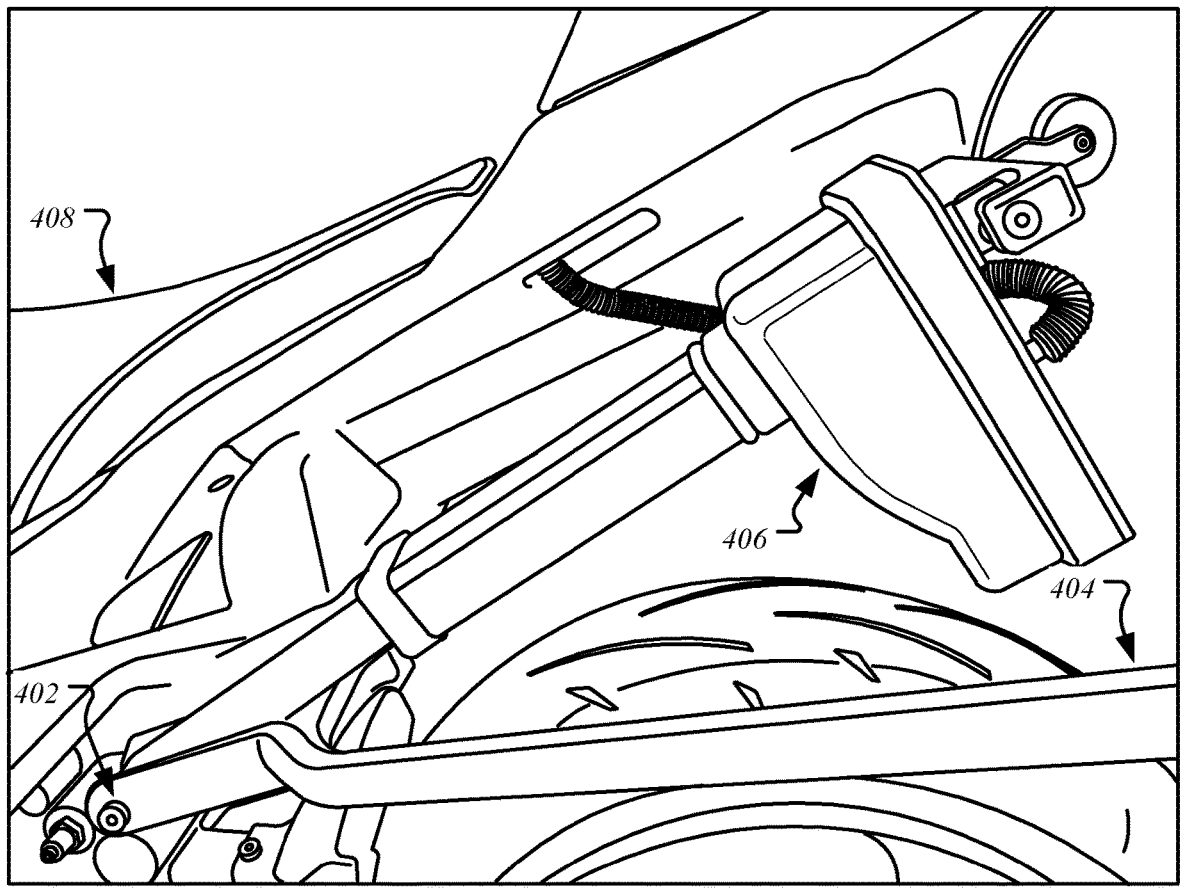
FIG. 4 illustrates a raised motorcycle support assembly, according to an embodiment.

FIG. 4 illustrates a raised motorcycle support assembly, according to an embodiment. The motorcycle support assembly, when in a raised position, extends each primary support beam 404 rearward from the motorcycle, with the wheels lifted from the ground. The support assembly can be mounted to a rear frame rail 402 of the motorcycle, with the entirety of the assembly positioned below and to the left and right of a seat 408 of the motorcycle. The support assembly can be raised based on the action of an actuator assembly 406, which can be controlled by a switch or microcontroller/accelerometer as described with respect to FIG. 3.

Figure 5:
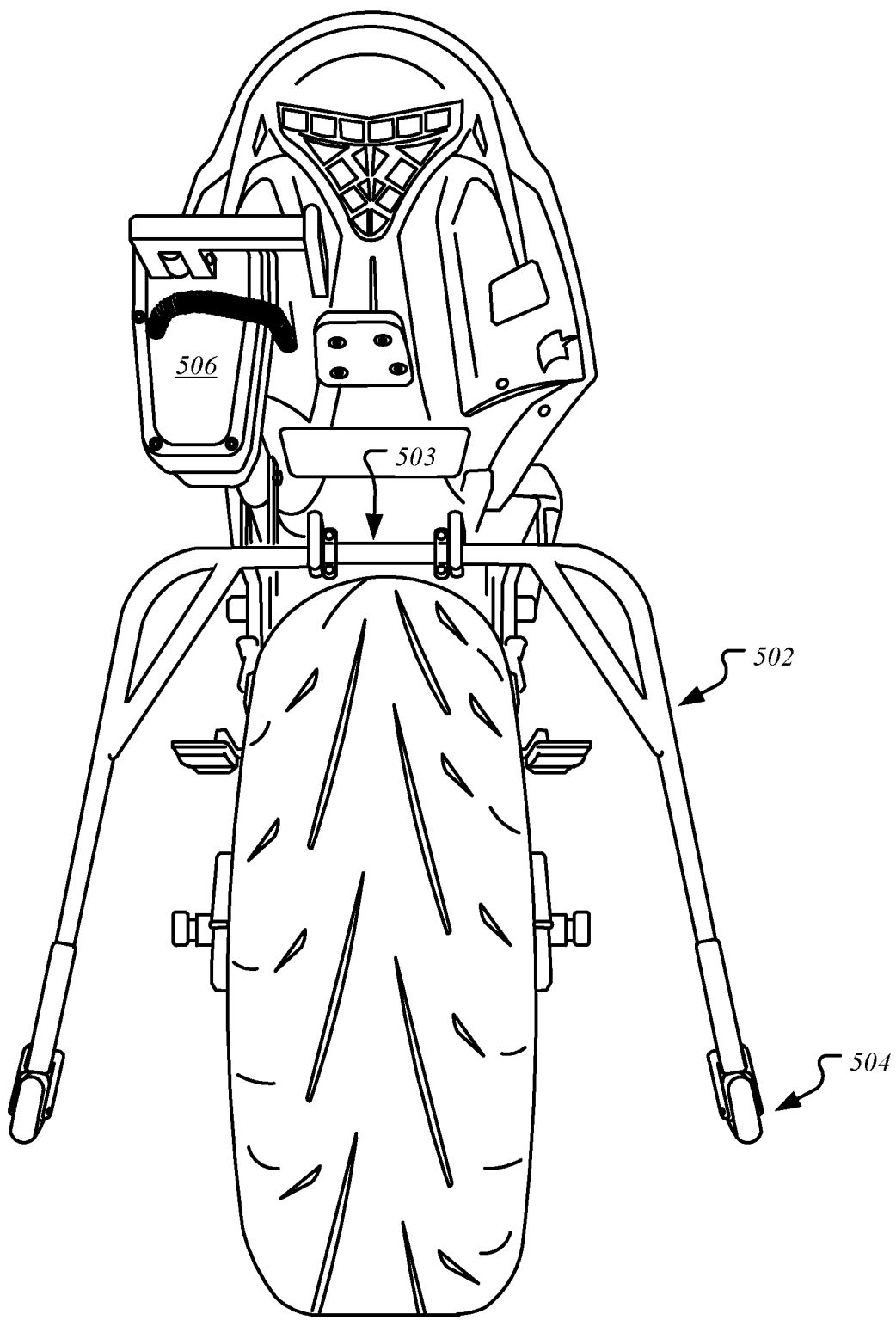
FIG. 5 illustrates a lowered motorcycle support assembly, according to an embodiment.

FIG. 5 illustrates a lowered motorcycle support assembly, according to an embodiment. When in the lowered position, each primary support beam 502 of the motorcycle support assembly swings to a vertical position as the motorcycle support assembly pivots within the rear frame rail mount 503, enabling at least one wheel 504 of the support assembly to contact the road and provide support for the motorcycle at low speeds or while in a stationary position. The motorcycle support assembly can pivot based on movement of an actuator assembly 506 mounted below the seat of the motorcycle. The actuator assembly 506, which can be actuator assembly 406 as in FIG. 4, can be controlled by a switch or microcontroller/accelerometer as described with respect to FIG. 3. Although the actuator assembly 506 is shown on one side of the motorcycle, one embodiment provides for an actuator assembly 506 on each side of the motorcycle.

Where multiple instances of the actuator assembly 506 are present, in one embodiment each instance of the actuator assembly 506 may be independently controlled. The assemblies can be hydraulic actuators with independent control or can be electric actuators with independent control. In one embodiment, electro-hydraulic actuators can be used.

Figure 6:
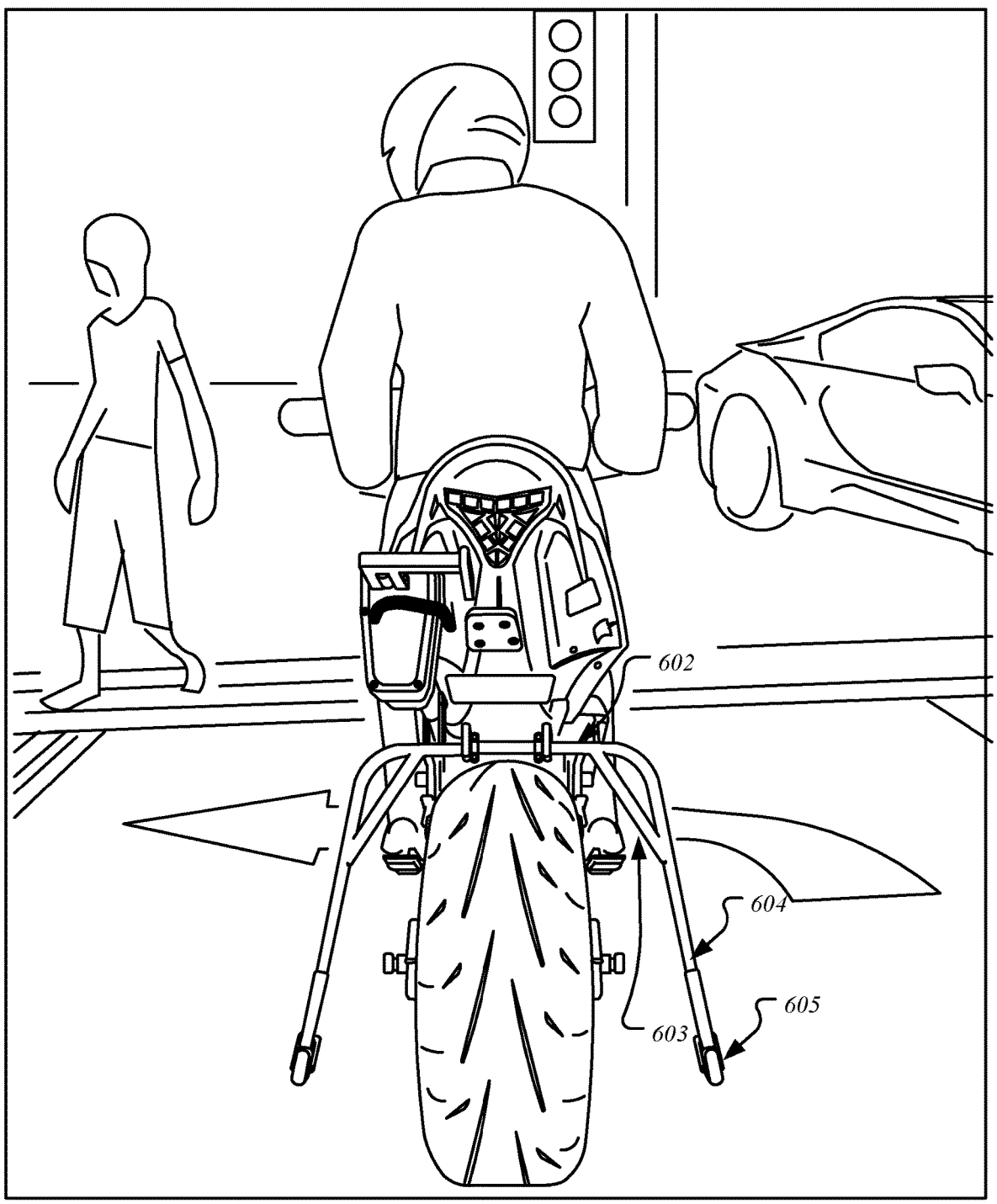
FIG. 6 illustrates a lowered motorcycle support assembly, according to an embodiment.

FIG. 6 illustrates a lowered motorcycle support assembly, according to an embodiment. As illustrated, a motorcycle support assembly can be lowered into position to support the motorcycle at lower speeds and while stationary. The support assembly can pivot within a support 602 attached to the rear frame of the motorcycle, with a primary support beam 604 positioned in a substantially vertical position, and a secondary support beam 603 positioned to provide additional support for the primary support beam 604. At least one wheel 606 of the motorcycle support assembly can contact the road or other surface across which the motorcycle traverses.

Lower Mount Support Assembly

Figure 7:
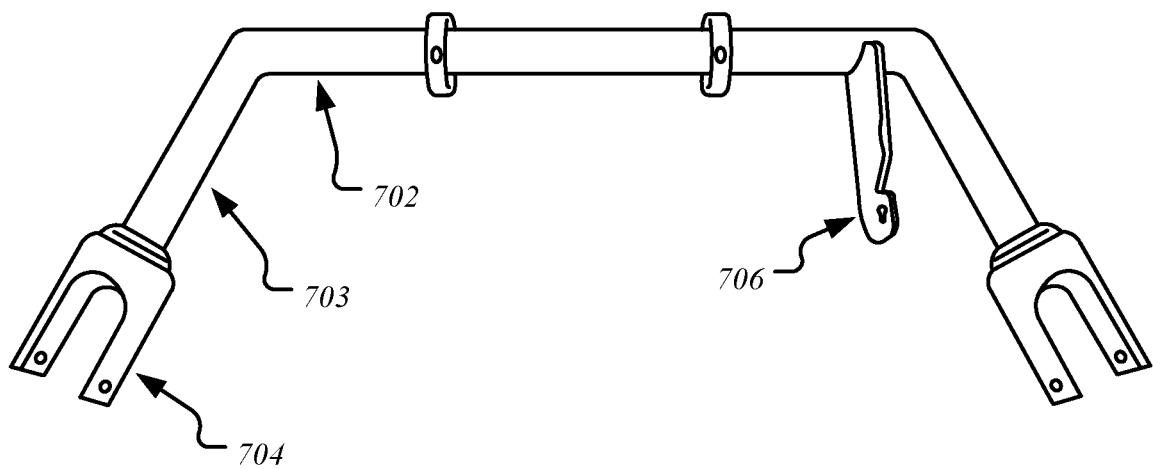
FIG. 7 illustrates a motorcycle support bar, according to an additional embodiment.

FIG. 7 illustrates a motorcycle support bar, according to an additional embodiment. An additional, lower mount support assembly is also described herein, which can mount to a lower frame of a motorcycle and support the motorcycle while at low speeds and while stationary. The illustrated motorcycle support bar includes a horizontal section 702 that extends underneath the motorcycle and is mounted to a lower portion of the motorcycle frame. A support beam 703 on each end of the support bar extends outward diagonally from the horizontal section and includes a wheel mount 704. The support bar also includes an actuator mount 706 to couple the support bar with an arm of an actuator assembly.

Figure 8:
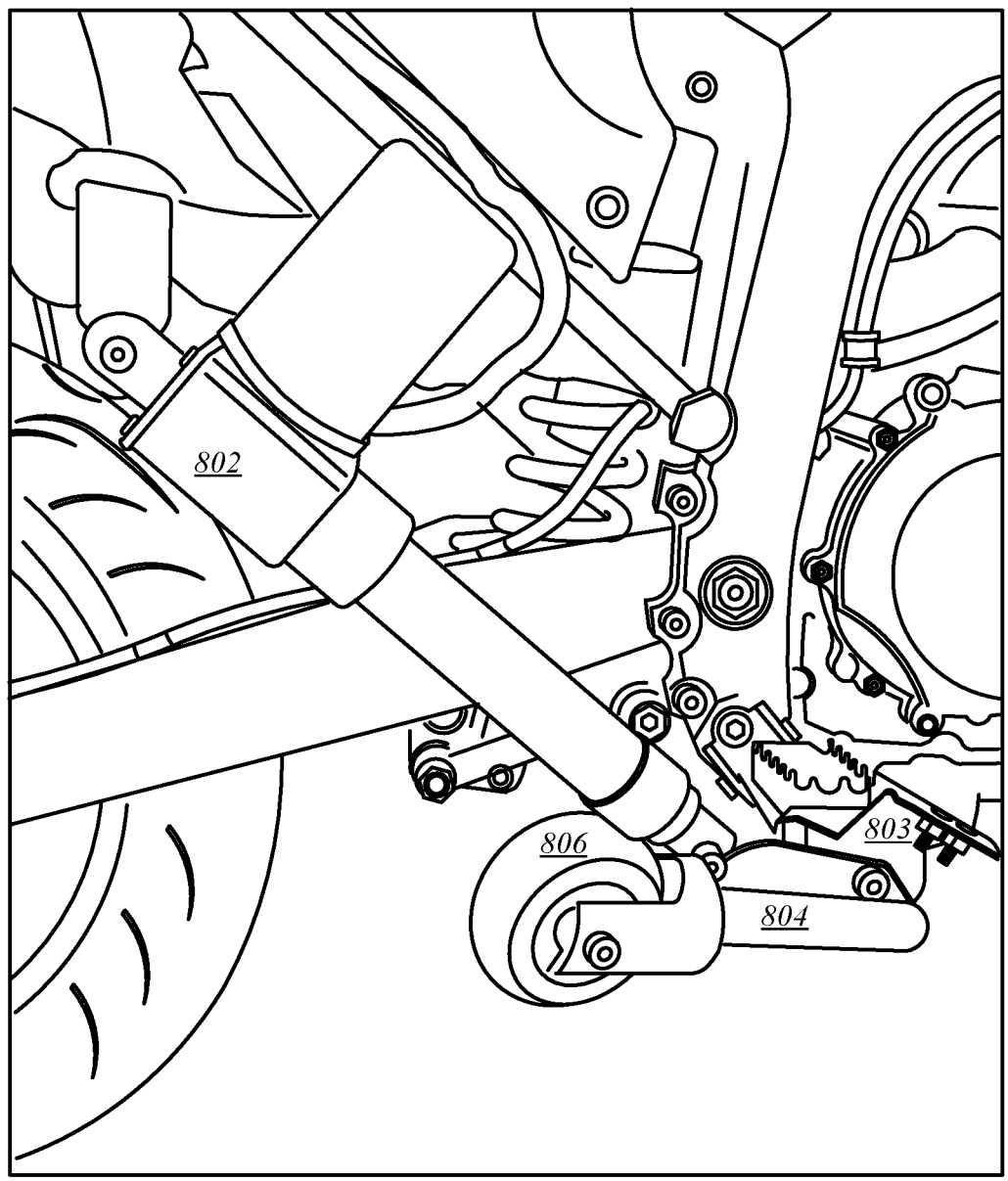
FIG. 8 illustrates a raised motorcycle support assembly, according to an additional embodiment.

FIG. 8 illustrates a raised motorcycle support assembly, according to an additional embodiment. The lower mount support assembly includes an actuator assembly 802, wheel 806, support beam 804, and includes a lower frame mount 803, which enables the support beam to mount to the lower frame of the motorcycle. The motorcycle support assembly, when in the lowered position, supports the motorcycle on each side.

Figure 9:
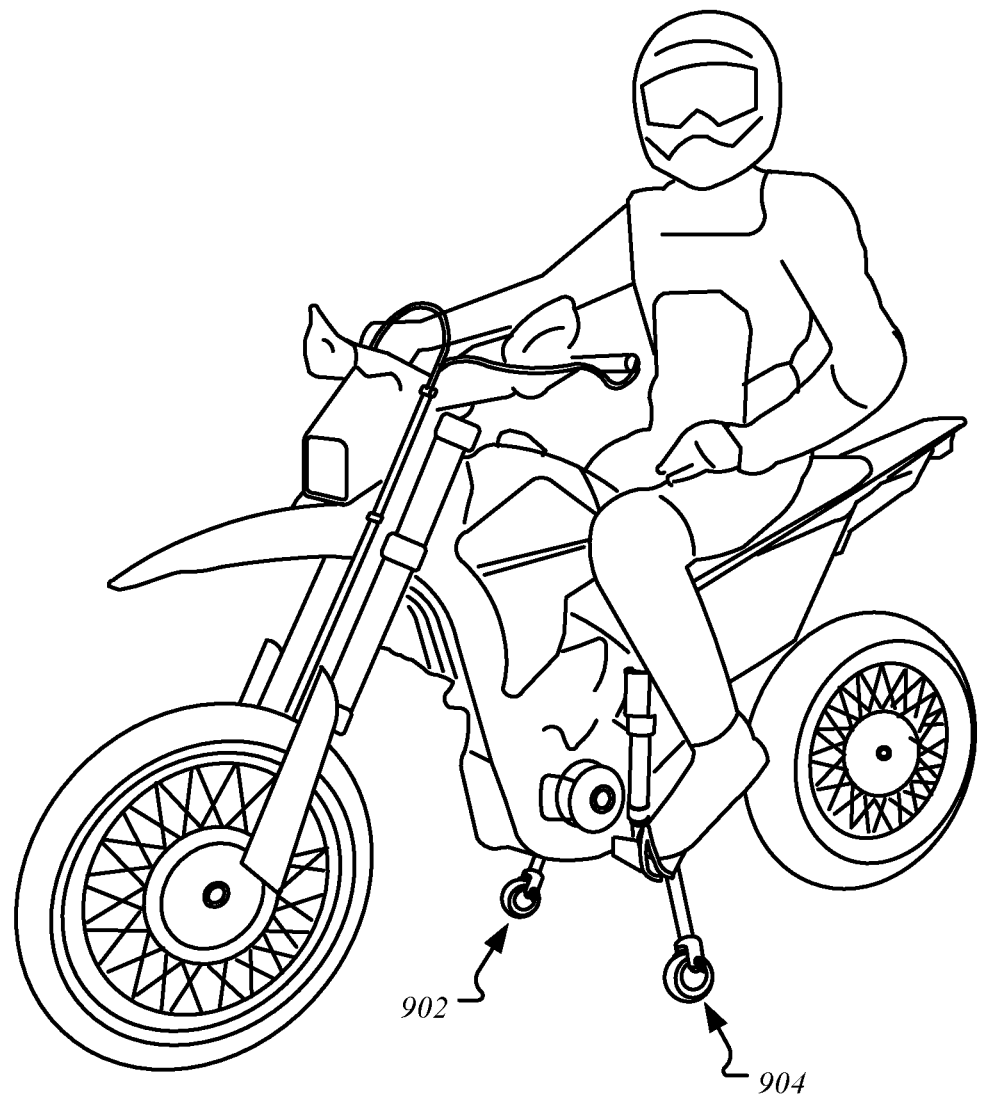
FIG. 9 illustrates a lowered motorcycle support assembly, according to an additional embodiment.

FIG. 9 illustrates a lowered motorcycle support assembly, according to an additional embodiment. The lower mount support assembly, when in the lowered position, supports the motorcycle on each side, with a left wheel 902 and a right wheel 904 making contact with the surface over which the motorcycle operates. The lower mount support assembly can be controlled in a similar manner as the rear mount support assembly described above, using a pivot mechanism powered by a linear actuator, with the actuator controlled via a handlebar mounted thumb switch or, in some embodiments, an accelerometer equipped microcontroller.

Figure 10:
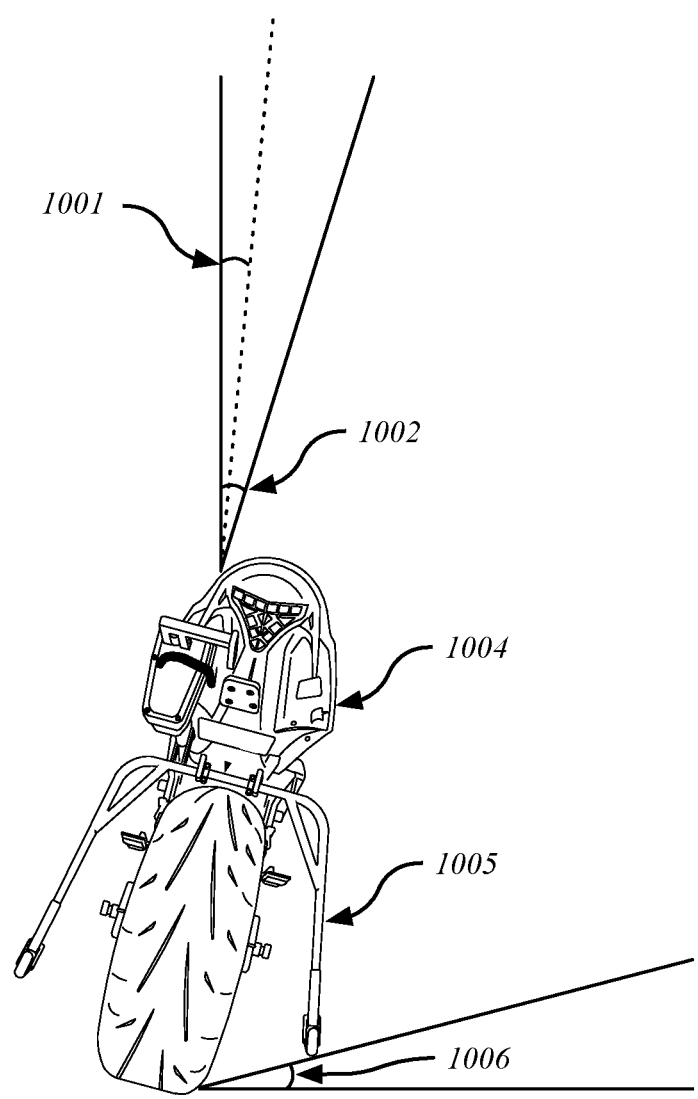
FIG. 10 illustrates factors to consider when automatically raising and lowering a motorcycle support assembly, according to an embodiment.

FIG. 10 illustrates factors to consider when automatically raising and lowering a motorcycle support assembly, according to an embodiment. In one embodiment an accelerometer equipped microcontroller can be used to automatically lower and raise either a lower mount or rear mount support assembly. The accelerometer equipped microcontroller can automatically lower and raise either a lower mount or rear mount support assembly based on a detected lean angle of the motorcycle.

In one embodiment, optimal lean based deployment would occur when a vehicle 1004 has a lean angle 1002 that is above a threshold lean angle 1001 and below a maximum lean angle 1006. The maximum lean angle 1006 can differ based on the type of vehicle and the length of the support assembly 1005. Above the maximum lean angle 1006, the support assembly 1005 may not be able to fully deploy and support the vehicle. In one embodiment, the speed at which the support assembly 1005 is deployed may vary based on the increase in lean angle of the vehicle 1004, to enable the support assembly 1005 to be rapidly deployed before the vehicle lean angle 1002 becomes too high. However, lean based deployment can be disabled when the vehicle is above a certain speed and may be performed only when the microcontroller detects that the vehicle is coming to a stop. Thus, in addition to lean angle, the microcontroller for the system an also actuate the assembly based on a combination of vehicle speed and lean angle. Vehicle speed can be provided to the microcontroller by an additional speed sensor or by using a speed sensor signal of the vehicle 1004.

Figure 11:
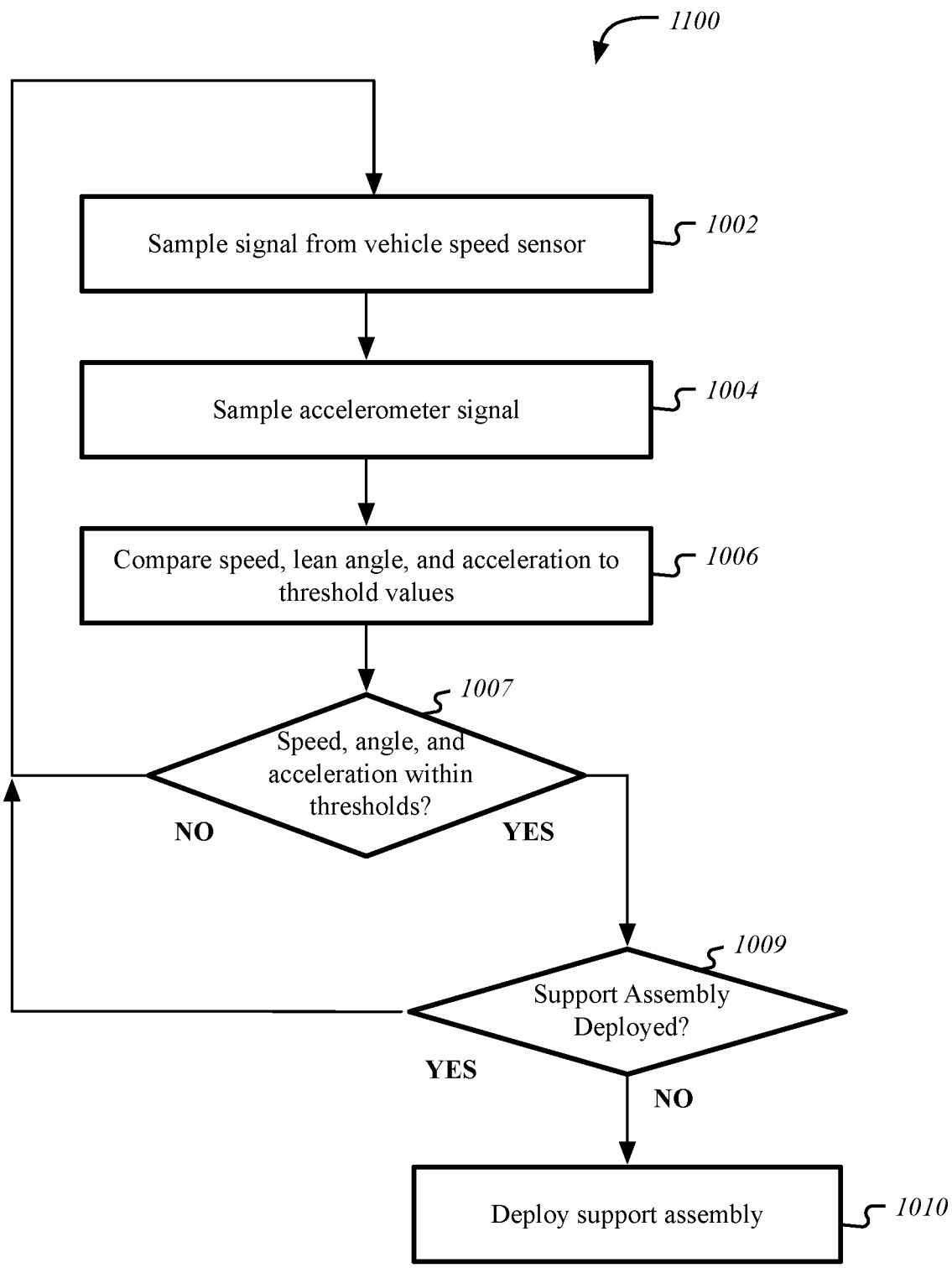
FIG. 11 illustrates a method to automatically deploy the support assembly via a microcontroller, according to an embodiment.

FIG. 11 illustrates a method 1100 to automatically deploy the support assembly via a microcontroller, according to an embodiment. In one embodiment the microcontroller can sample a signal from a vehicle speed sensor (block 1002). The microcontroller can then sample an accelerometer signal (block 1004) and compare a speed, acceleration, and lean angle to threshold values (block 1006). The microcontroller can then determine if the vehicle speed, acceleration, and lean angle are within the thresholds (block 1007). For example, the microcontroller can determine if the vehicle speed is below a speed threshold, the vehicle is decelerating, and the vehicle is within a specified lean angle range. If the speed, angle, and acceleration values do not indicate that the support assembly should be deployed, the microcontroller can return to block 1002 and continue sampling. If the determined speed, acceleration, and angle are within the thresholds at block 1007, the microcontroller can determine whether the support assembly is already deployed (block 1009). If the support assembly is already deployed, the microcontroller can continue sampling at block 1002. If the support assembly is not deployed, the microcontroller can deploy the support assembly (block 1010).

The speed, acceleration, and lean angle thresholds can be default values or can be configurable by a user. The microcontroller can store the default or configurable thresholds within internal registers. Configurable thresholds can be stored on non-volatile storage coupled with the microcontroller and loaded during initialization.

Figure 12:
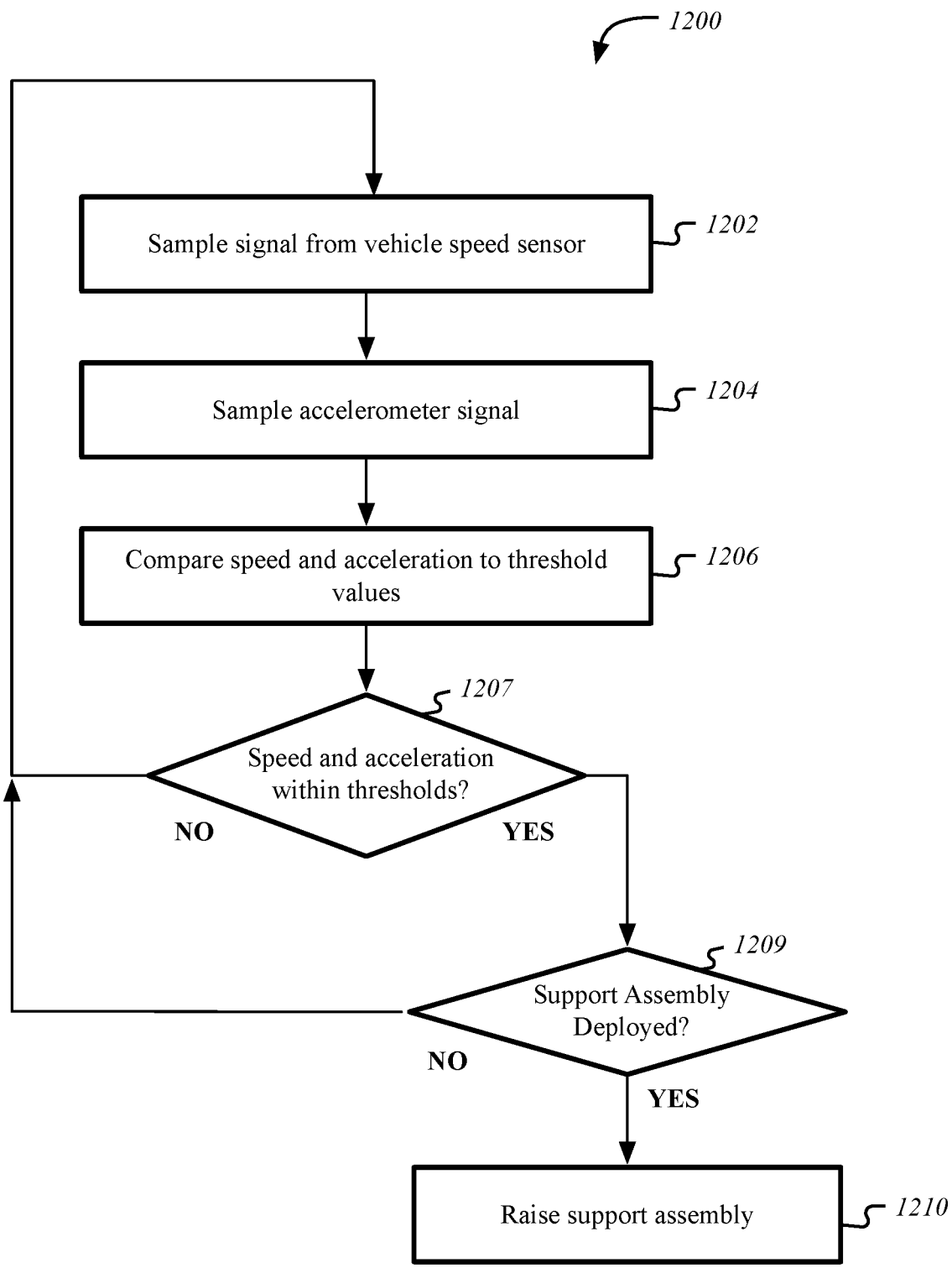
FIG. 12 illustrates a method to automatically raise the support assembly via a microcontroller, according to an embodiment.

FIG. 12 illustrates a method 1200 to automatically raise the support assembly via a microcontroller, according to an embodiment. In one embodiment the microcontroller can sample a signal from a vehicle speed sensor (block 1202). The microcontroller can then sample an accelerometer signal (block 1204) and compare a speed and acceleration threshold values (block 1206). The microcontroller can then determine if the vehicle speed and acceleration are within the thresholds (block 1207). For example, the microcontroller can determine if the vehicle speed is above a speed threshold and that the vehicle is accelerating. If the speed and acceleration values do not indicate that the support assembly should be raised, the microcontroller can return to block 1202 and continue sampling. If the determined speed and acceleration are within the thresholds at block 1207, the microcontroller can determine whether the support assembly is deployed (block 1209). If the support assembly is deployed, the microcontroller can raise the support assembly (block 1210). If the support assembly is not deployed at block 1209, the microcontroller can return to block 1202 and continue sampling.

The speed and acceleration thresholds can be default values or can be configurable by a user. The microcontroller can store the default or configurable thresholds within internal registers during operation. Configurable thresholds can be stored on non-volatile storage coupled with the microcontroller and loaded during initialization. Additionally, some of the operations illustrated in method 1100 in FIG. 11 and method 1200 in FIG. 12 can be performed in parallel rather than sequentially.

Described above are multiple embodiments of a stabilizer system to enable a rider having limited leg mobility to operate two-wheeled motorized vehicle (e.g., motorcycle). Riders having limited leg mobility may not have sufficient leg mobility or leg strength to balance the motorcycle at low speeds or to support the motorcycle when stopped. The stabilizer system described herein can be employed to stabilize the motorcycle on behalf of the rider. The multiple embodiments described herein can be configured for multiple different mounting positions on multiple different types, makes, and models of motorcycle. One embodiment can mount to a rear frame mount of a sport style motorcycle, while another embodiment can be configured to mount to a lower frame mount of various styles and types of motorcycles. Each embodiment can be controlled via a handlebar mounted switch device, which can be used to raise or lower a stabilization system via an electrically powered actuator and/or hydraulic system.

One embodiment provides for an actuated stabilizer system to be installed on a motorized vehicle, such as a motorcycle or another gyroscopically balanced vehicle. The system comprises an actuator coupled with an electrical system of the motorized vehicle, the actuator including an electric motor and a piston, wherein the electric motor is configured to extend and retract the piston based on a control input to the electric motor; a stabilizer bar configured to be mounted to a frame of the motorized vehicle, the stabilizer bar including multiple wheel assemblies and an actuator mount to enable the stabilizer bar to couple with the piston of the actuator. The stabilizer bar is configured to pivot between a raised and lowered position based on movement of the piston of the actuator. An extended position of the piston corresponds to a lowered position and a retracted position corresponds to a raised position. The stabilizer bar is to laterally support the motorized vehicle when the stabilizer bar is in the lowered position. In one embodiment the actuator is a linear actuator. The stabilizer bar can be configured to mount to a rear position of the frame of the motorized vehicle or a lower frame position of the motorized vehicle. The stabilizer bar can be electrically or hydraulically actuated. In one embodiment, the stabilizer bar can be automatically raised and lowered.

One embodiment provides for a motorized vehicle including an actuated stabilizer system, the vehicle comprising a frame to which an engine and one or more wheels are attached; an actuator coupled with an electrical system of the motorized vehicle, the actuator including an electric motor and a piston. The electric motor is configured to cause the piston to extend and retract based on a control input to the electric motor. Additionally, a stabilizer bar is included, which is configured to be mounted to the frame of the motorized vehicle, the stabilizer bar including multiple wheel assemblies and an actuator mount to enable the stabilizer bar to couple with the piston of the actuator. The stabilizer bar is configured to pivot between a raised and lowered position based on movement of the piston of the actuator. An extended position of the piston corresponds to a lowered position and a retracted position corresponds to a raised position. The stabilizer bar, when lowered, is positioned to laterally support the motorized vehicle.

Those skilled in the art will appreciate from the foregoing description that the broad techniques of the embodiments can be implemented in a variety of forms. For example, while a two wheeled vehicle (e.g., motorcycle) is generally described herein, the support system can be adapted to a vehicle having any number of inline wheels, where the vehicle uses the gyroscopic effect of the wheels to balance the vehicle while in motion and where such vehicle is generally unstable at low speeds. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An actuated stabilizer system to be installed on a motorized vehicle, the system comprising:
    an actuator coupled with an electrical system of the motorized vehicle, the actuator including an electric motor and a piston, wherein the electric motor is configured to cause the piston to extend and retract based on a control input to the electric motor;
    a stabilizer bar configured to be mounted to a frame of the motorized vehicle, the stabilizer bar including multiple wheel assemblies and an actuator mount having a single actuator attachment that is offset from the center of the stabilizer bar, the actuator attachment to enable the stabilizer bar to couple with the piston of the actuator, wherein the stabilizer bar is a single u-shaped bar that is rigid and continuous between the multiple wheel assemblies, includes a first portion and multiple second portions, the multiple second portions each including a wheel assembly of the multiple wheel assemblies, and is configured to pivot between a raised and lowered position based on movement of the piston of the actuator, wherein an extended position of the piston corresponds to a lowered position and a retracted position corresponds to a raised position; and
    wherein the stabilizer bar is to laterally support the motorized vehicle on at least two sides when the stabilizer bar is in the lowered position.

2. The actuated stabilizer system as in claim 1, wherein the actuator is a linear actuator.

3. The actuated stabilizer system as in claim 1, wherein the piston is to be driven at least partially hydraulically.

4. The actuated stabilizer system as in claim 1, wherein the first portion of the stabilizer bar is configured to be mounted to an upper rear position of the frame of the motorized vehicle.

5. The actuated stabilizer system as in claim 1, wherein the first portion of the stabilizer bar is configured to be mounted to a lower fame position of the motorized vehicle.

6. The actuated stabilizer system as in claim 1, wherein the stabilizer bar is configured to be raised and lowered via manual activation of the actuator.

7. The actuated stabilizer system as in claim 1, wherein the stabilizer bar is configured to be raised and lowered via automatic activation of the actuator based on at least a speed and acceleration of the motorized vehicle.

8. The actuated stabilizer system as in claim 7, wherein the stabilizer bar is configured to be raised and lowered via automatic activation of the actuator based additionally on a lean angle of the motorized vehicle.

9. The actuated stabilizer system as in claim 8, wherein automatic activation of the actuator is overridable via a manual switch.

10. A motorized vehicle including an actuated stabilizer system, the vehicle comprising:
    a frame to which an engine and one or more wheels are attached;
    an actuator coupled with an electrical system of the motorized vehicle, the actuator including an electric motor and a piston, wherein the electric motor is configured to cause the piston to extend and retract based on a control input to the electric motor;
    a stabilizer bar configured to be mounted to the frame of the motorized vehicle, the stabilizer bar including multiple wheel assemblies and an actuator mount having a single actuator attachment that is offset from the center of the stabilizer bar, the actuator attachment to enable the stabilizer bar to couple with the piston of the actuator, wherein the stabilizer bar is a single u-shaped bar that is rigid and continuous between the multiple wheel assemblies, includes a first portion and multiple second portions, the multiple second portions each include a wheel assembly of the multiple wheel assemblies and the stabilizer bar is configured to pivot between a raised and lowered position based on movement of the piston of the actuator, wherein an extended position of the piston corresponds to a lowered position and a retracted position corresponds to a raised position; and
    wherein the stabilizer bar is to laterally support the motorized vehicle on at least two sides when the stabilizer bar is in the lowered position.

11. The motorized vehicle as in claim 10, wherein the actuator is a linear actuator.

12. The motorized vehicle as in claim 10, wherein the piston is to be driven at least partially hydraulically.

13. The motorized vehicle as in claim 10, wherein the first portion of the stabilizer bar is configured to be mounted to an upper rear position of the frame of the motorized vehicle.

14. The motorized vehicle as in claim 10, wherein the first portion of the stabilizer bar is configured to be mounted to a lower fame position of the motorized vehicle.

15. The motorized vehicle as in claim 10, wherein the stabilizer bar is configured to be raised and lowered via manual activation of the actuator.

16. The motorized vehicle as in claim 10, wherein the stabilizer bar is configured to be raised and lowered via automatic activation of the actuator based on at least a speed and acceleration of the motorized vehicle.

17. The motorized vehicle as in claim 16, wherein the stabilizer bar is configured to be raised and lowered via automatic activation of the actuator based additionally on a lean angle of the motorized vehicle.

18. The motorized vehicle as in claim 17, wherein automatic activation of the actuator is overridable via a manual switch.

* * * * *